United States Patent
Li et al.

(10) Patent No.: US 12,289,126 B1
(45) Date of Patent: Apr. 29, 2025

(54) METHOD AND DEVICE FOR JOINT SUPPRESSION OF NARROWBAND AND MULTIPLE ACCESS INTERFERENCE

(71) Applicant: NATIONAL UNIVERSITY OF DEFENSE TECHNOLOGY, Changsha (CN)

(72) Inventors: Jingyuan Li, Changsha (CN); Rong Zhou, Changsha (CN); Xinming Huang, Changsha (CN); Shaojie Ni, Changsha (CN); Hang Gong, Changsha (CN); Wenxiang Liu, Changsha (CN); Zengjun Liu, Changsha (CN); Ke Zhang, Changsha (CN); Yuchen Xie, Changsha (CN); Sixin Wang, Changsha (CN); Kuo Cao, Changsha (CN)

(73) Assignee: NATIONAL UNIVERSITY OF DEFENSE TECHNOLOGY, Changsha (CN)

( * ) Notice: Subject to any disclaimer, the term of this patent is extended or adjusted under 35 U.S.C. 154(b) by 0 days.

(21) Appl. No.: 18/984,355

(22) Filed: Dec. 17, 2024

(30) Foreign Application Priority Data

Jun. 25, 2024 (CN) .......................... 202410824461.4

(51) Int. Cl.
*H04B 1/71* (2011.01)
*H04B 1/04* (2006.01)
(Continued)

(52) U.S. Cl.
CPC ......... *H04B 1/1036* (2013.01); *H04B 1/0458* (2013.01)

(58) Field of Classification Search
None
See application file for complete search history.

(56) References Cited

U.S. PATENT DOCUMENTS 7,809,433 B2 * 10/2010 Keenan ................ A61B 5/7203
  600/509
8,009,750 B2 * 8/2011 Chrabieh .......... H04L 27/26536
  375/260
(Continued)

FOREIGN PATENT DOCUMENTS

CN        1949685      4/2007
CN    101222460 A    7/2008
(Continued)

OTHER PUBLICATIONS

Zhao Du, et al., Suppression of Digital Narrowband Interference Using Parallel Interference Cancellation Detector, Computer Simulation, May 31, 2004, pp. 95-98, vol. 22., No. 3 Claims involved: 1-7.

(Continued)

*Primary Examiner* — Pablo N Tran
(74) *Attorney, Agent, or Firm* — Piloff Passino & Cosenza LLP; Rachel Piloff; Sean Passino

(57) ABSTRACT

A method and a device for joint suppression of narrowband and multiple access interference are provided. The method includes: performing time domain windowing processing on a received signal, and performing frequency domain interference processing on a signal after windowing processing to obtain a matched filter and a time domain signal; obtaining reconstructed baseband received data for a signal of each channel; obtaining reconstructed signals after matched filtering; accumulating the reconstructed signals of multiple channels to obtain a reconstructed accumulated value, obtaining a compensation value according to a difference between the time domain signal and the reconstructed accumulated value, and compensating the reconstructed signals with the compensation value to obtain an actual received (Continued)

signal of the each channel; and outputting a joint suppression result.

7 Claims, 9 Drawing Sheets

(51) Int. Cl.
*H04B 1/10* (2006.01)
*H04B 1/707* (2011.01)
*H04B 1/7103* (2011.01)

(56) References Cited

U.S. PATENT DOCUMENTS

| | | | | |
|---|---|---|---|---|
| 8,199,862 B2* | 6/2012 | Belogolovy | ........ | H04L 27/2614 |
| | | | | 341/120 |
| 10,243,719 B2* | 3/2019 | Bharadia | ................ | H04B 1/525 |
| 10,284,356 B2* | 5/2019 | Bharadia | ................ | H04B 1/525 |
| 2019/0159733 A1* | 5/2019 | Shusterman | ......... | A61N 1/3718 |

FOREIGN PATENT DOCUMENTS

| | | |
|---|---|---|
| CN | 103248377 A | 8/2013 |
| CN | 104101871 | 10/2014 |
| CN | 105282071 A | 1/2016 |
| EP | 0980149 | 2/2000 |
| EP | 2635086 | 10/2011 |
| RU | 2539573 | 1/2015 |
| WO | 2012055321 | 5/2012 |

OTHER PUBLICATIONS

Li Jingyuan, Research on Multiple-Access Interference Effects and Mitigation Techniques in Satellite Navigation Systems, China Doctoral Dissertations Full-text Database (Nat'l University of Defense Technology), Dec. 1, 2014, pp. i-xiv &1-153 (abstract translation near beginning) full text, Claims involved: 1-7.
Marco Lops, et al., Narrow-Band-Interference Suppression in Multiuser CDMA Systems, IEEE Transactions on Communications, Sep. 30, 1998, pp. 1163-1175, vol. 46, No. 9 Claims involved: 1-7.
Retrieval report-First search dated Jul. 24, 2024 in SIPO application No. 202410824461.4.
Notification to Grant Patent Right for Invention dated Jul. 30, 2024 in SIPO application No. 202410824461.4.

* cited by examiner

METHOD AND DEVICE FOR JOINT SUPPRESSION OF NARROWBAND AND MULTIPLE ACCESS INTERFERENCE

CROSS-REFERENCE TO RELATED APPLICATIONS

This application claims priority to Chinese Patent Application No. 202410824461.4, filed on Jun. 25, 2024, the contents of which are hereby incorporated by reference.

TECHNICAL FIELD

The present disclosure relates to the technical field of navigation communication, and in particular to a method and a device for joint suppression of narrowband and multiple access interference.

BACKGROUND

Code division multiple access (CDMA) technology is widely used in different fields, including ground mobile communication (such as third generation (3G)/fourth generation (4G)), satellite navigation (such as Beidou and global positioning system (GPS)), military anti-jamming communication (such as radar) and so on. Its technical characteristics are that all users use the same frequency to communicate, the signal transmitter uses a specific spreading code to spread the original signal, and the receiver uses the correlation of spreading codes to distinguish different users. However, due to the spreading codes of different users or non-ideal channel transmission, the orthogonality of codes is not perfect, so there is multiple access interference (MAI) between different users working on the same frequency, and with the increase of users, multiple access interference becomes more and more serious. For the communication system, MAI will lead to the decrease of signal-to-noise ratio and the increase of error rate, which will further affect the system capacity. For satellite navigation system, MAI not only leads to the increase of bit error rate, but also leads to the decrease of pseudo-code tracking performance and ranging accuracy.

CDMA spread spectrum systems are not only affected by their own multiple access interference, but also by various intentional or unintentional interference signals, the most common of which is narrowband interference, such as parasitic radiation and harmonics of various communication devices, out-of-band radiation and parasitic radiation of communication devices, harmonics of mobile and fixed ground base stations and television stations, and some radar systems, mobile satellite communication systems and military communication systems, which may all interfere with the receiver and even fail to lock the expected signal normally. It is not difficult to predict that with the increasing number of wireless devices and the increasingly complex electromagnetic environment, the receiver will face more and more severe anti-interference challenges.

In order to solve the problems of multiple access interference and narrowband interference, frequency domain narrowband interference suppression and parallel interference cancellation (PIC) cascade processing are widely used for interference suppression, and the processing flow is shown in FIG. 1. The specific processing methods are as follows: step 1, firstly, the signal is subjected to narrowband interference suppression. The methods commonly used for narrowband interference suppression include time domain interference suppression technology and frequency domain interference suppression technology. Among them, the realization of frequency domain interference suppression technology is relatively simple, that is, the sampling points of the input time domain signals are transformed into the frequency domain by Fast Fourier Transform (FFT) algorithm, and the interference spectrum is removed by using the difference between the signal and the interference spectrum characteristics, and then the frequency domain signals after the narrowband interference is removed are transformed back into the time domain by Inverse Fast Fourier Transform (IFFT) algorithm to complete the narrowband interference suppression. Step 2, secondly, the parallel interference cancellation (PIC) method is used to suppress multiple access interference. The processing method includes: using the time domain sampling point data output in step 1 to track each user signal in parallel, and using the carrier tracking loop to obtain the carrier Doppler estimation value $\hat{f}_d^k$ of the kth user and track the carrier phase value $\hat{\varphi}_k$ in real time; using code tracking loop to keep the local code $C_k$ of the kth user in initial synchronization with the received signal; estimating the amplitude $A_k$ and information bit $d_k$ of the received signal by using the despread symbol correlation accumulated value, thus reconstructing the baseband received data $\hat{r}_k$ of each user:

$$\hat{r}_k(n) = \hat{A}_k(nT_z)\hat{d}_k(nT_s - \hat{\tau}_k)C_k(nT_s - \hat{\tau}_k)\cos[2\pi\hat{f}_d^{(k)}nT_s + \hat{\varphi}_k],$$

where n represents the nth sampling point, $T_s$ represents the sampling period, and $\tau_k$ represents the offset of the local code from the pseudo code of the received signal, that is, the code phase.

Then, the sampling point data output in step 1 is subtracted from the multiple access interference reconstructed signal to obtain "clean" sampling data of each signal. After interference cancellation, the data is finely tracked by the traditional code tracking loop and carrier tracking loop, respectively, to obtain the pseudo-code ranging value after removing multiple access interference and the information bits demodulated after interference cancellation. The tracking-reconstruction-cancellation steps are repeated, and the detection signals of different users are obtained after multi-level parallel iterative interference cancellation.

The above processing methods may improve the equivalent carrier-to-noise ratio and ranging performance of user signals to a certain extent. However, because the two anti-jamming processing methods are simply cascaded, the mutual influence and mutual assistance of the two anti-jamming processing methods are not considered, so the joint effect of the two anti-jamming technologies is not fully exerted. Specifically, the shortcomings of traditional processing methods are as follows: after the received signal has been subjected to anti-narrowband interference, the baseband signal spectrum of the received signal changes, resulting in a mismatch between the local multiple access interference reconstructed signal and the baseband signal after narrowband interference suppression/anti-narrowband jamming, which introduces an additional cancellation error. The measured values of user signals after multiple access interference cancellation and fine tracking are not fed back to the parameter update of anti-narrowband interference filter, which is not conducive to the accuracy and convergence speed of anti-narrowband interference filter parameters. To address the problem, the present disclosure provides a processing method for joint suppression of narrowband and multiple access interference, which may improve the equivalent carrier-to-noise ratio of signals and the pseudo-code tracking accuracy.

SUMMARY

Based on this, a method and device for joint suppression of narrowband and multiple access interference are provided.

A method for joint suppression of narrowband and multiple access interference, including:

performing time domain windowing processing on a received signal, and performing frequency domain interference processing on a signal after windowing processing to obtain a matched filter and a time domain signal;

performing parallel acquisition on multi-channel signals of the time domain signal by using multi-channel receiving channels to obtain reconstructed baseband received data for a signal of each channel;

filtering the reconstructed baseband received data by using the matched filter to obtain reconstructed signals after matched filtering;

accumulating the reconstructed signals of multiple channels to obtain a reconstructed accumulated value, obtaining a compensation value according to a difference between the time domain signal and the reconstructed accumulated value, and compensating the reconstructed signals with the compensation value to obtain an actual received signal of the each channel; and when a pseudo-code ranging value and a carrier-to-noise ratio estimation value of the actual received signal meet a threshold, outputting a joint suppression result.

In one embodiment, the method also includes: acquiring a window function $w(n)$, and multiplying the received signal $r(n)$ with the window function $w(n)$ to obtain a windowed signal $r_{WIN}(n)$;

performing FFT transformation on the windowed signal $r_{WIN}(n)$, and obtaining a frequency domain signal $S_{WIN}(f_i)$, where $f_i$ represents an ith spectral line;

generating a frequency domain weighting vector value $H_{AJ}(f_i)=[h_0, h_1, \ldots, h_{N-1}]$ of an adaptive anti-narrowband interference filter according to the frequency domain signal $SWIN(f_i)$;

generating a spreading code cumulative power spectrum function $$\sum_{k=1}^{K} S_{PN}^k(f_i)$$

of all users, setting an initial value of the frequency domain weighting vector value $H_{AJ}(f_i)$ to 0, and calculating an effective carrier-to-noise ratio of an initial signal;

judging a weighting value $h_i$ corresponding to each spectral line $f_i$ by adopting a polling method, and if a weighting value $h_i$ corresponding to this spectral line is set to 0 or $$\frac{1}{S_{WIN}(f_i)},$$

a user equivalent carrier-to-noise ratio increases, then setting $h_i$ to 0 or $$\frac{1}{S_{WIN}(f_i)},$$

otherwise setting $h_i$ to 1;

generating a multi-user spreading code cumulative power spectrum function $$\sum_{k=1}^{K} S_{PN}^k(f_i),$$

setting an initial value of a frequency domain weighting vector value $H_{AJ}(f_i)$ to be all 1, and calculating an equivalent carrier-to-noise ratio of an initial signal and a pseudo-code tracking accuracy of a coherent delay locked loop:

judging a weighting value $h_i$ corresponding to each spectral line $f_i$ by adopting a polling method, and if a weighting value $h_i$ corresponding to this spectral line is set to 0 or $$\frac{1}{S_{WIN}(f_i)},$$

a user equivalent carrier-to-noise ratio CNR and a pseudo-code tracking accuracy value are improved, then setting $h_i$ to 0 or $$\frac{1}{S_{WIN}(f_i)},$$

otherwise setting $h_i$ to 1; and finally, optimizing to obtain a frequency domain weight $H_{AJ}(f_i)$ of an anti-narrowband interference filter, and then processing the frequency domain signal $S_{WIN}(f_i)$ by an anti-narrowband filter to eliminate a narrowband interference signal, and then converting the frequency domain signal into a time domain signal $r_{WIN+AJ}(n)$ by IFFT operation.

In one embodiment, the method also includes: obtaining a carrier Doppler estimation value $\hat{f}_d^k$ of a kth user and tracking a carrier phase value $\hat{\varphi}_k$ in real time by using a carrier tracking loop; obtaining a code phase $\hat{\tau}_k$ of the kth user by using a code tracking loop; obtaining an estimation of a spreading code $C_k$ of a received signal of the kth user by using a code correlation accumulated value; using a symbol correlation accumulated value after despreading to obtain estimations of a received signal amplitude $A_k$ and an information bit $d_k$ of the kth user, thus reconstructing reconstructed baseband received data $\hat{r}_k$ of each user.

In one embodiment, the method also includes: performing windowing processing on the reconstructed baseband received data $\hat{r}_k(n)$ to obtain a signal $\hat{r}_{WIN}^k(n)$ after the windowing processing;

performing FFT transformation on N points $\hat{r}_{WIN}^k(n)$, and transforming the time domain signal into a frequency domain signal $\hat{s}_{WIN}^k(f_i)$;

multiplying the frequency domain signal $\hat{s}_{WIN}^k(f_i)$ with the frequency domain weight $H_{AJ}(f_i)$ of the anti-narrowband interference filter to obtain a frequency domain signal after matched filtering; and performing IFFT transformation on the frequency domain signal after matched filtering to obtain reconstructed signals $\hat{r}_{WIN+AJ}^k(n)$ after matched filtering;

In one embodiment, the method also includes: accumulating the reconstructed signals $\hat{r}_{WIN+AJ}^k(n)$ of the multiple channels to obtain a reconstructed accumulated value $$\sum_{k=1}^{K} \hat{r}_{WIN+AJ}^{k}(n);$$

obtaining a compensation value ε(nT$_s$) according to the difference between the time domain signal r$_{WIN+AJ}$(n) and the reconstructed accumulated value $$\sum_{k=1}^{K} \hat{r}_{WIN+AJ}^{k}(n);$$

and compensating the reconstructed signals $\hat{r}_{WIN+AJ}^{k}$(n) with the compensation value ε(nT$_s$) to obtain the actual received signal r$_k$(n)=$\hat{r}_{WIN+AJ}^{k}$(n)+ε(n) of the each channel.

In one embodiment, the method also includes: finely tracking the actual received signal through a traditional code tracking loop and the carrier tracking loop, and obtaining a pseudo-code ranging value and a carrier-to-noise ratio estimation value after removing the multiple access interference.

In one embodiment, the method also includes: if a user pseudo-code ranging value and a carrier-to-noise ratio estimation value after removing the multiple access interference meet performance requirements, clearing current data, and starting processing of newly received data; meanwhile, updating the multi-user spreading code cumulative power spectrum function $$\sum_{k=1}^{K} S_{PN}^{k}(f_i)$$

in weight generation of the anti-narrowband interference filter to $$\sum_{k=1}^{K} A_k^2 S_{PN}^{k}(f_i)$$

using a signal amplitude estimation value A$_k$ of each actual user; and if the user pseudo-code ranging value and the carrier-to-noise ratio estimation value after removing the multiple access interference do not meet the performance requirements, iteratively processing the received signal.

Compared with the prior art, the method has following technical effects.

The present disclosure proposes that the reconstructed signals are subjected to the matched filtering first, and then the multiple access interference cancellation, so that no additional cancellation error is introduced, and the cancelled user signals are cleaner, thereby improving the user equivalent carrier-to-noise ratio and ranging accuracy. At the same time, the present disclosure uses the signal fine tracking measurement result after anti-multiple access interference to iteratively update the frequency domain weights of the anti-narrowband filter, thus improving the convergence speed and accuracy of the filter parameters.

DETAILED DESCRIPTION OF THE EMBODIMENTS

In order to make the purpose, technical solutions and advantages of the present disclosure more clear, the present disclosure will be further described in detail with the attached drawings and embodiments. It should be understood that the specific embodiments described herein are only used to explain the present disclosure and are not used to limit the present disclosure.

Figure 1:
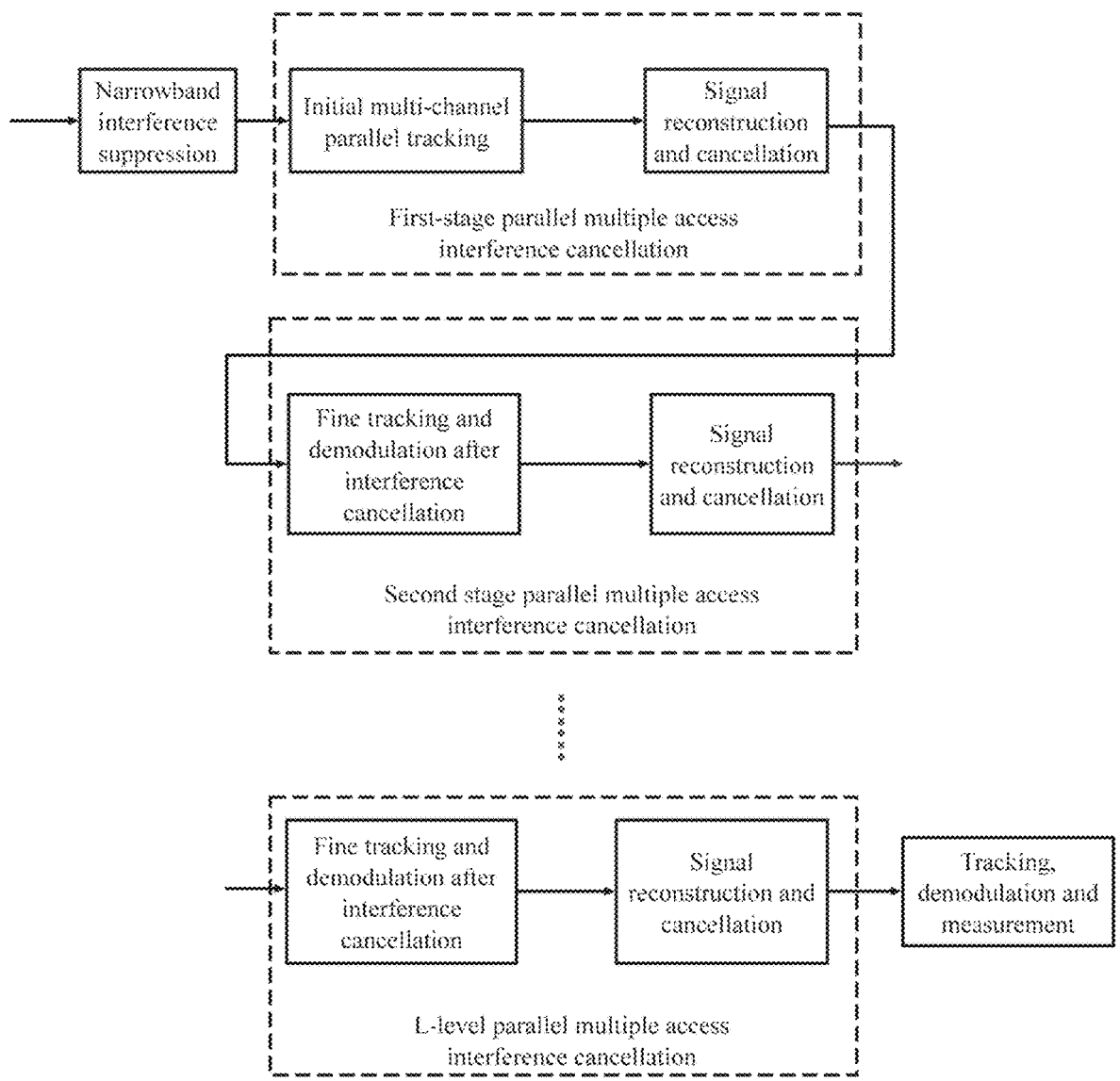
FIG. 1 is a schematic diagram of a traditional cascade processing flow of anti-narrowband interference and multiple access interference.
Figure 2:
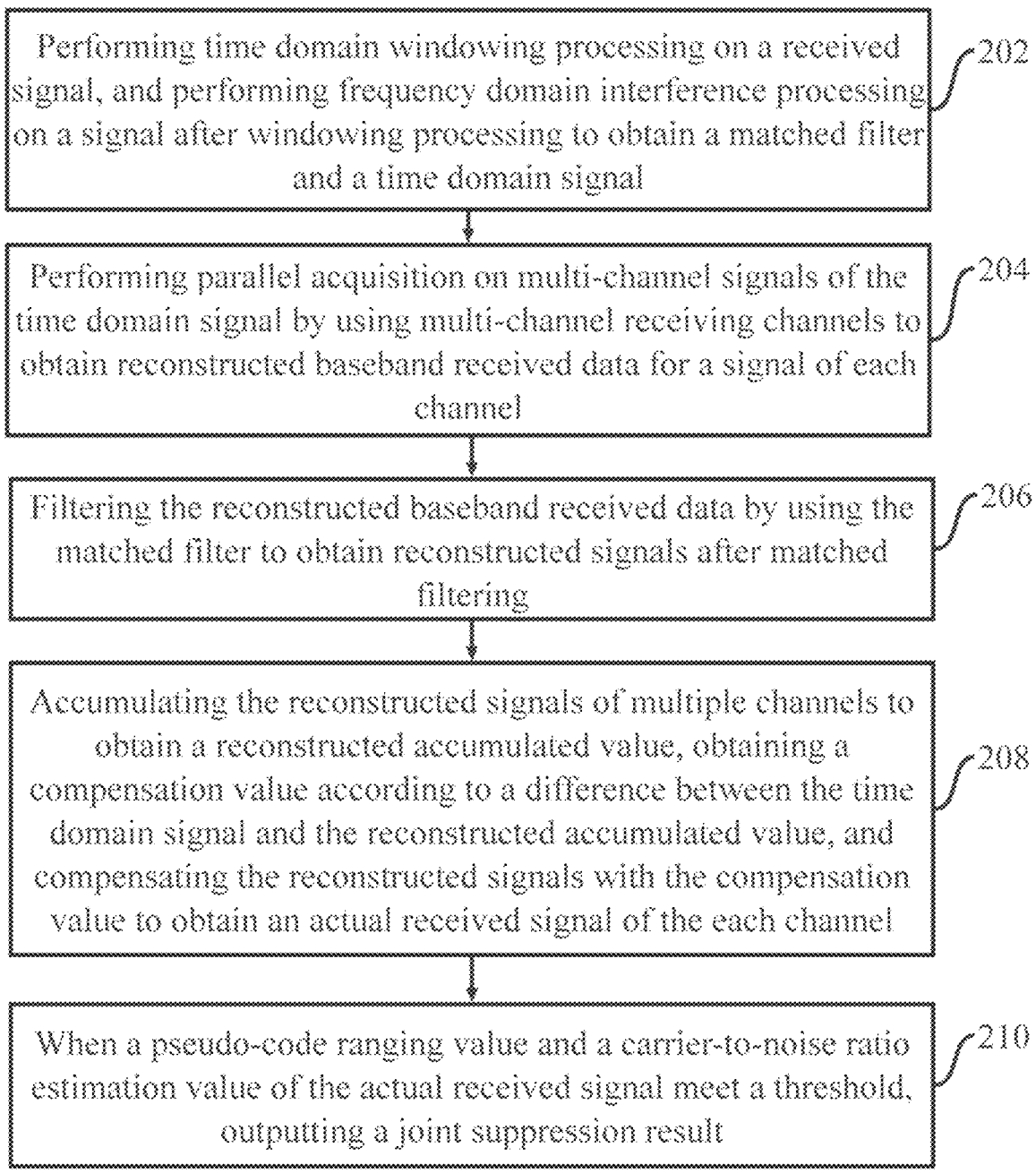
FIG. 2 is a flow chart of a method for joint suppression of narrowband and multiple access interference in one embodiment.

In one embodiment, as shown in FIG. 2, a method for joint suppression of narrowband and multiple access interference is provided, including:

step 202, performing time domain windowing processing on a received signal, and performing frequency domain interference processing on a signal after windowing processing to obtain a matched filter and a time domain signal;

step 204, performing parallel acquisition on multi-channel signals of the time domain signal by using multi-channel receiving channels to obtain reconstructed baseband received data for a signal of each channel;

step 206, filtering the reconstructed baseband received data by using the matched filter to obtain reconstructed signals after matched filtering;

step 208, accumulating the reconstructed signals of multiple channels to obtain a reconstructed accumulated value, obtaining a compensation value according to a difference between the time domain signal and the reconstructed accumulated value, and compensating the reconstructed signals with the compensation value to obtain an actual received signal of the each channel; and step 210, when a pseudo-code ranging value and a carrier-to-noise ratio estimation value of the actual received signal meet a threshold, outputting a joint suppression result.

In the above-mentioned method for joint suppression of narrowband and multiple access interference, the reconstructed signals are subjected to the matched filtering first, and then the multiple access interference cancellation, so that no additional cancellation error is introduced, and the cancelled user signals are cleaner, thereby improving the user equivalent carrier-to-noise ratio and ranging accuracy.

At the same time, the present disclosure uses the signal fine tracking measurement result after anti-multiple access interference to iteratively update the frequency domain weights of the anti-narrowband filter, thus improving the convergence speed and accuracy of the filter parameters.

Figure 3:
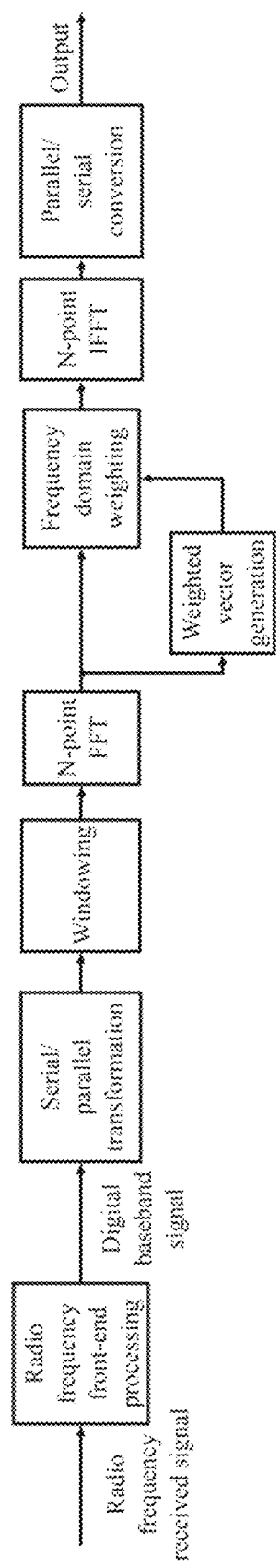
FIG. 3 is a schematic flow chart of anti-narrowband interference processing of a received signal in one embodiment.

One embodiment is shown in FIG. 3: acquiring a window function w(n), and multiplying the received signal r(n) with the window function w(n) to obtain a windowed signal $r_{WIN}(n)$; performing FFT transformation on the windowed signal $r_{WIN}(n)$, and obtaining a frequency domain signal $S_{WIN}(f_i)$, where $f_i$ represents an ith spectral line; generating a frequency domain weighting vector value $H_{AJ}(f_i) = [h_0, h_1, \ldots, h_{N-1}]$ of an adaptive anti-narrowband interference filter according to the frequency domain signal $S_{WIN}$ generating a spreading code cumulative power spectrum function $$\sum_{k=1}^{K} S_{PN}^{k}(f_i)$$

of all users, setting an initial value of the frequency domain weighting vector value $H_{AJ}(f_i)$ to 0, and calculating an effective carrier-to-noise ratio of an initial signal; judging a weighting value $h_i$ corresponding to each spectral line $f_i$ by adopting a polling method, and if a weighting value $h_i$ corresponding to this spectral line is set to 0 or $$\frac{1}{S_{WIN}(f_i)},$$

a user equivalent carrier-to-noise ratio increases, then setting $h_i$ to 0 or $$\frac{1}{S_{WIN}(f_i)},$$

otherwise setting $h_i$ to 1; generating a multi-user spreading code cumulative power spectrum function $$\sum_{k=1}^{K} S_{PN}^{k}(f_i),$$

setting an initial value of a frequency domain weighting vector value $H_{AJ}(f_i)$ to be all 1, and calculating an equivalent carrier-to-noise ratio of an initial signal and a pseudo-code tracking accuracy of a coherent delay locked loop; judging a weighting value $h_i$ corresponding to each spectral line $f_i$ by adopting a polling method, and if a weighting value $h_i$ corresponding to this spectral line is set to 0 or $$\frac{1}{S_{WIN}(f_i)},$$

a user equivalent carrier-to-noise ratio CNR and a pseudo-code tracking accuracy value are improved, then setting $h_i$ to 0 or $$\frac{1}{S_{WIN}(f_i)},$$

otherwise setting $h_i$ to 1; and finally, optimizing to obtain a frequency domain weight $H_{AJ}(f_i)$ of an anti-narrowband interference filter, and then processing the frequency domain signal $S_{WIN}(f_i)$ by an anti-narrowband filter to eliminate a narrowband interference signal, and then converting the frequency domain signal into a time domain signal $r_{WIN+AJ}(n)$ by IFFT operation.

Specifically, the window function may be Hanning window, Hamming window, Blackman window, Kaiser window, etc. The receiving device selects a corresponding window function according to actual requirements. Taking Hanning window as an example, its window function is defined as:

$$w(n) = \begin{cases} 0.5\left[1 - \cos\left(\frac{2\pi n}{N-1}\right)\right], & 0 \le n \le N-1 \\ 0, & \text{otherwise} \end{cases},$$

where n represents the data of the nth sampling point.

In this embodiment, the equivalent carrier-to-noise ratio is calculated as follows:

$$CNR = \frac{\left|\sum_{i=0}^{N-1} h_i \sum_{k=1}^{K} S_{PN}^{k}(f_i)\right|^2}{\sum_{i=0}^{N-1} \left[h_i^2 S_{WIN}(f_i) \sum_{k=1}^{K} S_{PN}^{k}(f_i)\right]};$$

the formula for calculating the pseudo-code tracking accuracy of the coherent delay locked loop is as follows:

$$\sigma_{CELP}^2 = \frac{B_L(1 - 0.5B_L T)\sum_{i=0}^{N-1} h_i S_{WIN}(f_i)\sin^2(\pi f_i \Delta)}{(2\pi)^2 \left\{\sum_{i=0}^{N-1}\left[h_i \sum_{k=1}^{K} S_{PN}^{k}(f_i)\right]\right\}\left\{\sum_{i=0}^{N-1}\left[h_i \cdot f_i \cdot \sin(\pi f_i \Delta)\sum_{k=1}^{K} S_{PN}^{k}(f_i)\right]\right\}^2},$$

where $\Delta$ is an early-late correlator interval; $B_L$ is a noise bandwidth of a code tracking loop, and T is a coherent accumulation time.

One embodiment is as follows: obtaining a carrier Doppler estimation value $\hat{f}_d^k$ of a kth user and tracking a carrier phase value $\hat{\varphi}_k$ in real time by using a carrier tracking loop; obtaining a code phase $\hat{\tau}_k$ of the kth user by using a code tracking loop; obtaining an estimation of a spreading code $C_k$ of a received signal of the kth user by using a code correlation accumulated value; using a symbol correlation accumulated value after despreading to obtain estimations of a received signal amplitude $A_k$ and an information bit $d_k$ of the kth user, thus reconstructing reconstructed baseband received data $\hat{r}_k$ of each user.

Figure 4:
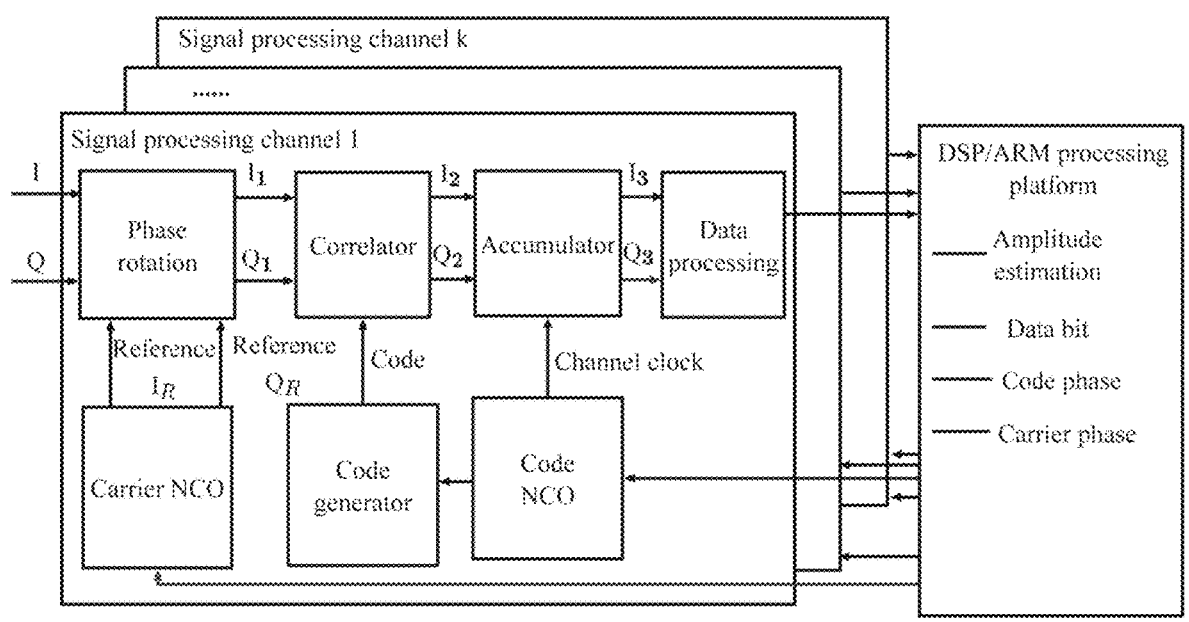
FIG. 4 is a schematic diagram of multi-channel signal tracking processing provided in one embodiment.

Specifically, the time domain signal $r_{WIN+AJ}(n)$ is input into a multi-channel tracking module, as shown in FIG. 4, where the module is composed of a plurality of receiving channels, and each of the receiving channels is composed of a carrier tracking loop, a code tracking loop, etc., a carrier Doppler estimation value $\hat{f}_d^k$ of a kth user is obtained and a carrier phase value $\hat{\varphi}_k$ is tracked in real time by using a carrier tracking loop; a code phase $\tau_k$ of the kth user is obtained by using a code tracking loop; an estimation of a spreading code $C_k$ of a received signal of the kth user is obtained by using a code correlation accumulated value; a symbol correlation accumulated value after despreading is used to obtain estimations of a received signal amplitude $A_k$ and an information bit $d_k$ of the kth user. A multiple access interference reconstruction module may reconstruct the baseband received signal $\hat{r}_k$ of each user according to the information bit, signal amplitude, local pseudo code and real-time estimated value of local carrier output by the multi-channel tracking module, where $T_s$ is a sampling period:

$$\hat{r}_k(n)=\hat{A}_k(n)\hat{d}_k(nT_s-\hat{\tau}_k)C_k(nT_s-\hat{\tau}_k)\cos[2\pi\hat{f}_d^{(k)}nT_s+\hat{\varphi}_k].$$

Optionally, there are two methods for selecting the reconstructed user baseband received signal:

method 1: reconstructing all user baseband signals according to the key parameters of user signals output by the multi-channel tracking module;

method 2: setting the signal amplitude threshold $T_{th}$, and reconstructing the baseband received signal of the user when the signal amplitude estimation value of the user output by the multi-channel tracking module is $\geq T_{th}$, otherwise, not reconstructing the baseband received signal of the user.

Figure 5:
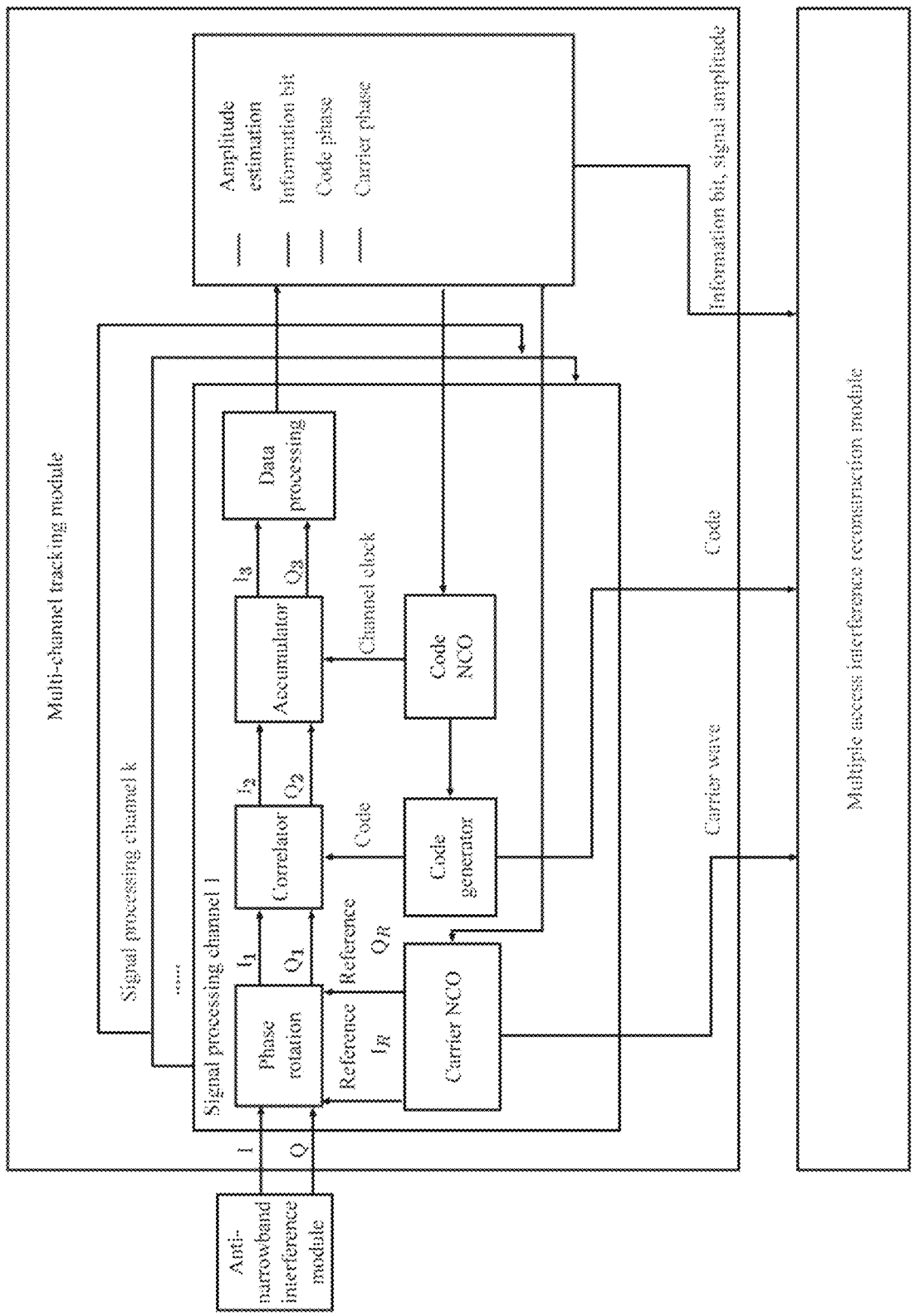
FIG. 5 is a schematic diagram of a user baseband signal reconstruction processing flow provided in one embodiment.

As may be seen from FIG. 5, the carrier and pseudo code of the reconstructed signal may be directly obtained from the Carrier NCO and Code NCO in the tracking loop of the multi-channel tracking module, and the data bit information may be determined by the data bit decision module in the hardware module, while the amplitude estimation value needs to be obtained according to the power estimation value of the signal.

One embodiment is as follows: performing windowing processing on the reconstructed baseband received data $\hat{r}_k(n)$ to obtain a signal $\hat{r}_{WIN}^k(n)$ after the windowing processing; performing FFT transformation on N points $\hat{r}_{WIN}^k(n)$, and transforming the time domain signal into a frequency domain signal $\hat{s}_{WIN}^k(f_i)$; multiplying the frequency domain signal $\hat{s}_{WIN}^k(f_i)$ with the frequency domain weight $H_{AJ}(f_i)$ of the anti-narrowband interference filter to obtain a frequency domain signal after matched filtering; and performing IFFT transformation on the frequency domain signal after matched filtering to obtain reconstructed signals $\hat{r}_{WIN+AJ}^k(n)$ after matched filtering.

Figure 6:
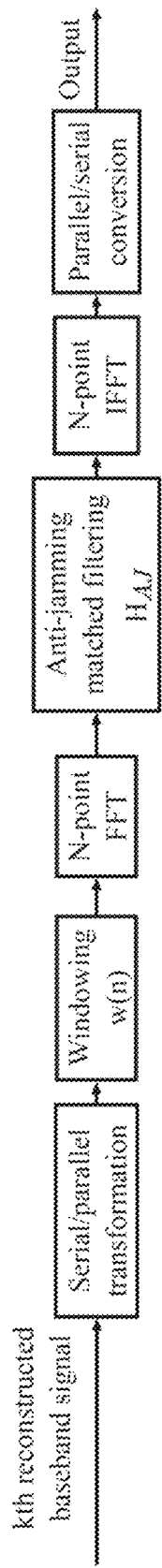
FIG. 6 is a schematic diagram of a processing flow of anti-interference matched filtering for a reconstructed baseband signal provided in one embodiment.

In this embodiment, because the narrowband interference signal overlaps with the user signal frequency band, the user frequency domain signal in the interference signal frequency band will also be suppressed when the received signal is subjected to interference suppression, so the influence of anti-interference processing should also be considered in the reconstructed signals, so that no additional error will be introduced when the multiple access interference is cancelled. The specific processing method is as follows:

as shown in FIG. 6, firstly, performing windowing processing on the reconstructed signals $\hat{r}_{WIN+AJ}^k(n)$ with the same window function $w(n)$ to obtain $\hat{r}_{WIN}^k(n)$, that is $\hat{r}_{WIN}^k(n)=\hat{r}_k(n)\cdot w(n)$;

then, performing FFT transformation on N points $\hat{r}_{WIN}^k(n)$, and transforming the time domain signal into the frequency domain signal $\hat{s}_{WIN}^k(f_i)$;

multiplying the frequency domain weight $H_{AJ}(f_i)$ of the anti-narrowband interference filter obtained in step 202 by the frequency domain signal $\hat{s}_{WIN}^k(f_i)$ one by one to obtain the frequency domain signal after anti-interference matched filtering, that is, $\hat{s}_{WIN+AJ}^k(f_i)=\hat{s}_{WIN}^k(f_i)\cdot H_{AJ}(f_i)$; and finally, performing N-point IFFT operation on $\hat{s}_{WIN+AJ}^k(f_i)$, and converting the frequency domain signal into the time domain signal, and obtaining the reconstructed signals $\hat{r}_{WIN+AJ}^k(n)$ after matched filtering.

Figure 7:
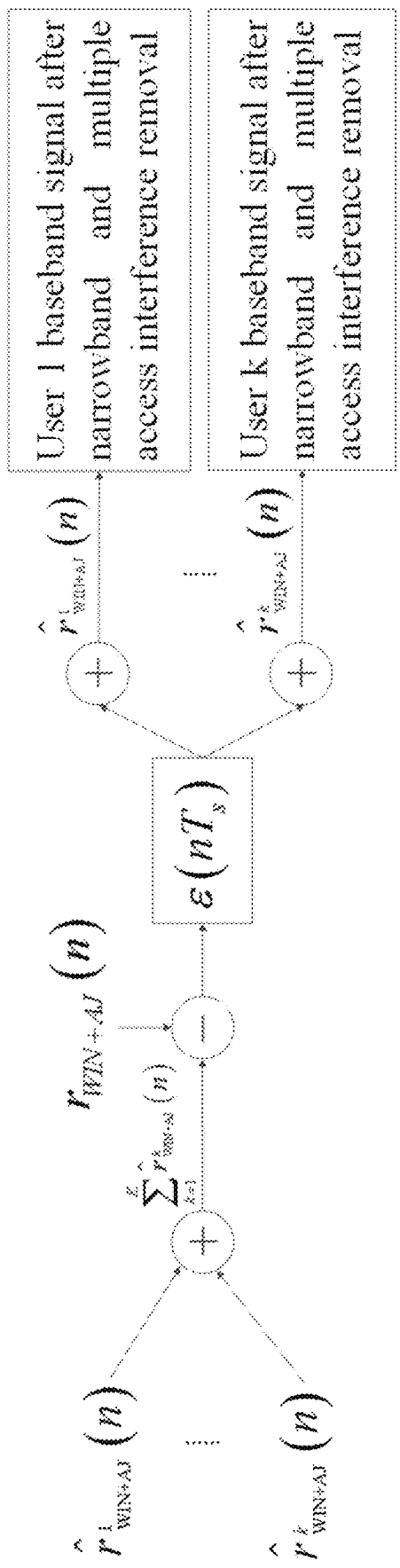
FIG. 7 is a schematic diagram of a multiple access interference cancellation processing flow provided in one embodiment.

One embodiment is shown in FIG. 7: accumulating the reconstructed signals $\hat{r}_{WIN+AJ}^k(n)$ of the multiple channels to obtain a reconstructed accumulated value $$\sum_{k=1}^{K}\hat{r}_{WIN+AJ}^k(n);$$

obtaining a compensation value $\varepsilon(nT_s)$ according to the difference between the time domain signal $\hat{r}_{WIN+AJ}(n)$ and the reconstructed accumulated value $$\sum_{k=1}^{K}\hat{r}_{WIN+AJ}^k(n);$$

and compensating the reconstructed signals $\hat{r}_{WIN+AJ}^k(n)$ with the compensation value $\varepsilon(nT_s)$ to obtain the actual received signal $r_k(n)=\hat{r}_{WIN+AJ}^k(n)+\varepsilon(n)$ of the each channel.

In one embodiment, the actual received signal is finely tracked by a traditional code tracking loop and a carrier tracking loop, and a pseudo-code ranging value and a carrier-to-noise ratio estimation value after removing the multiple access interference are obtained.

In another embodiment, if a user pseudo-code ranging value and a carrier-to-noise ratio estimation value after removing the multiple access interference meet performance requirements, current data is cleared, and processing of newly received data is started; meanwhile, the multi-user spreading code cumulative power spectrum function $$\sum_{k=1}^{K}S_{PN}^k(f_i)$$

in weight generation of the anti-narrowband interference filter is updated to $$\sum_{k=1}^{K}A_k^2 S_{PN}^k(f_i)$$

by using a signal amplitude estimation value $A_k$ of each actual user; and if the user pseudo-code ranging value and the carrier-to-noise ratio estimation value after removing the multiple access interference do not meet the performance requirements, the received signal is iteratively processed.

The iterative steps are as follows.

Figure 8:
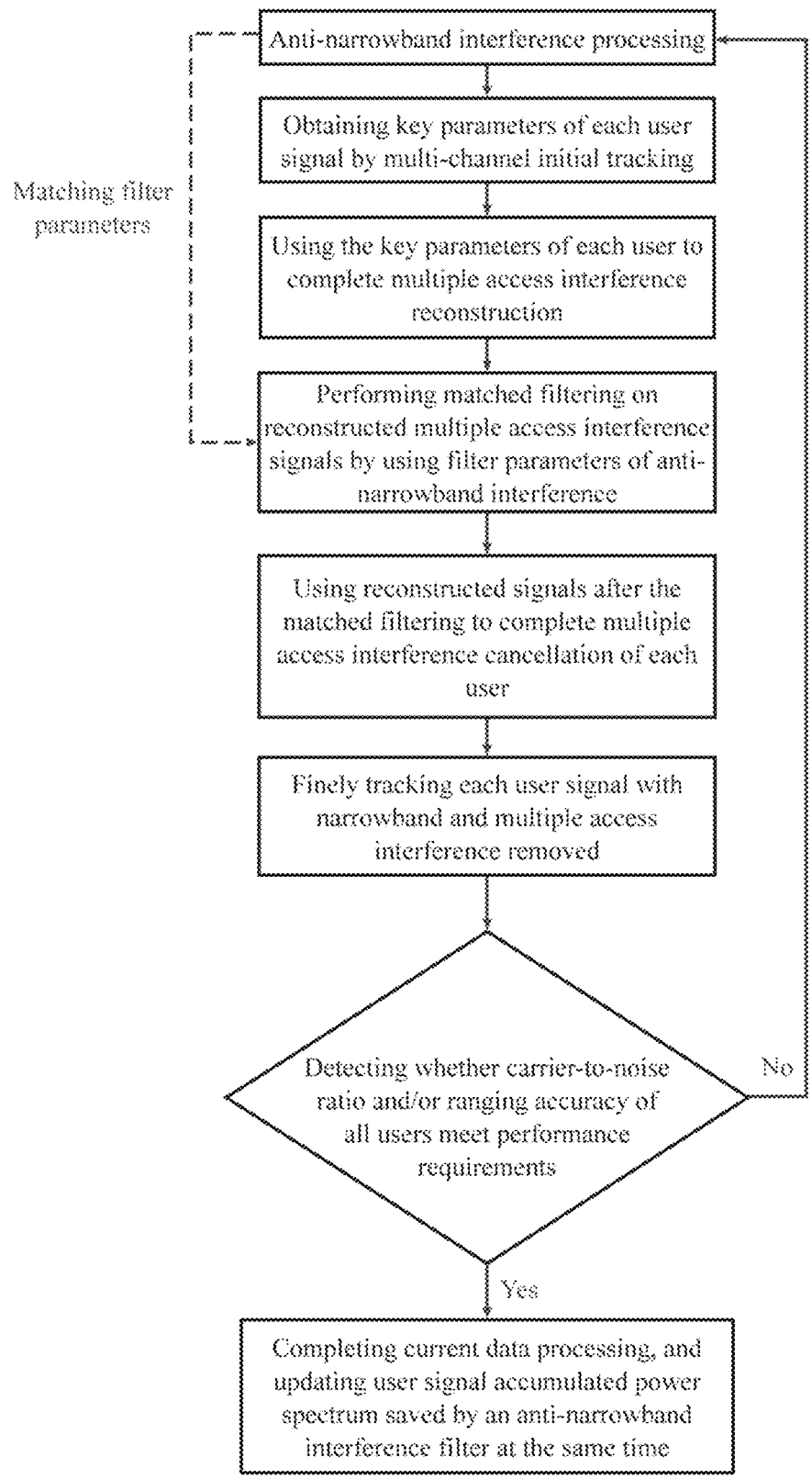
FIG. 8 is a schematic diagram of an interference suppression full closed-loop processing flow provided in one embodiment.

Method 1: as shown in FIG. 8, if all or most user pseudo-code ranging values and carrier-to-noise ratio estimation values do not meet the performance requirements, updating the anti-narrowband filter synchronously in the iterative process;

selecting the user signal with signal amplitude estimation value $\hat{A}_k$ higher than the set threshold $A_{th}$ to update the multi-user spreading code cumulative power spectrum function in the weight of the anti-narrowband interference filter, and updating to $$\sum_{k=1}^{K} \hat{A}_k^2 S_{PN}^k(f_i), \left(\hat{A}_k \geq A_{th}\right).$$

Anti-narrowband interference and multiple access interference processing will be carried out again, which will not be described in detail.

Method 2: if a small number of the user pseudo-code ranging values and carrier-to-noise ratio estimation values do not meet the performance requirements, not updating the anti-narrowband filter in the iterative process, and only iteratively processing the multiple access interference.

Figure 9:
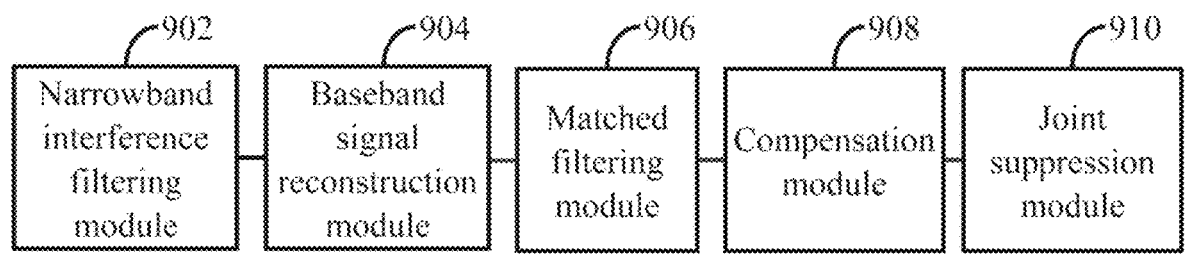
FIG. 9 is a structural block diagram of a device for joint suppression of narrowband and multiple access interference in one embodiment.

In one embodiment, as shown in FIG. 9, a device for joint suppression of narrowband and multiple access interference is provided, including:

- a narrowband interference filtering module 902, used for performing time domain windowing processing on a received signal, and performing frequency domain interference processing on a signal after windowing processing to obtain a matched filter and a time domain signal;
- a baseband signal reconstruction module 904, used for performing parallel acquisition on multi-channel signals of the time domain signal by using multi-channel receiving channels to obtain reconstructed baseband received data for a signal of each channel;
- a matched filtering module 906, used for filtering the reconstructed baseband received data by using the matched filter to obtain reconstructed signals after matched filtering;
- a compensation module 908, used for accumulating the reconstructed signals of multiple channels to obtain a reconstructed accumulated value, obtaining a compensation value according to a difference between the time domain signal and the reconstructed accumulated value, and compensating the reconstructed signals with the compensation value to obtain an actual received signal of the each channel; and
- a joint suppression module 910, used for when a pseudo-code ranging value and a carrier-to-noise ratio estimation value of the actual received signal meet a threshold, outputting a joint suppression result.

In one embodiment, the narrowband interference filtering module 902 is also used for acquiring a window function w(n), and multiplying the received signal r(n) with the window function w(n) to obtain a windowed signal $r_{WIN}(n)$;
performing FFT transformation on the windowed signal $r_{WIN}(n)$, and obtaining a frequency domain signal $S_{WIN}(f_i)$, where $f_i$ represents an ith spectral line;
generating a frequency domain weighting vector value $H_{AJ}(f_i)=[h_0, h_1, \ldots, h_{N-1}]$ of an adaptive anti-narrowband interference filter according to the frequency domain signal $S_{WIN}(f_i)$;
generating a spreading code cumulative power spectrum function $$\sum_{k=1}^{K} S_{PN}^k(f_i)$$

of all users, setting an initial value of the frequency domain weighting vector value $H_{AJ}(f_i)$ to 0, and calculating an effective carrier-to-noise ratio of an initial signal;
judging a weighting value $h_i$ corresponding to each spectral line $f_i$ by adopting a polling method, and if a weighting value $h_i$ corresponding to this spectral line is set to 0 or $$\frac{1}{S_{WIN}(f_i)},$$

a user equivalent carrier-to-noise ratio increases, then setting $h_i$ to 0 or $$\frac{1}{S_{WIN}(f_i)},$$

otherwise setting $h_i$ to 1;
generating a multi-user spreading code cumulative power spectrum function $$\sum_{k=1}^{K} S_{PN}^k(f_i),$$

setting an initial value of a frequency domain weighting vector value $H_{AJ}(f_i)$ to be all 1, and calculating an equivalent carrier-to-noise ratio of an initial signal and a pseudo-code tracking accuracy of a coherent delay locked loop:
judging a weighting value $h_i$ corresponding to each spectral line $f_i$ by adopting a polling method, and if a weighting value $h_i$ corresponding to this spectral line is set to 0 or $$\frac{1}{S_{WIN}(f_i)},$$

a user equivalent carrier-to-noise ratio CNR and a pseudo-code tracking accuracy value are improved, then setting $h_i$ to 0 or $$\frac{1}{S_{WIN}(f_i)},$$

otherwise setting $h_i$ to 1; and
finally, optimizing to obtain a frequency domain weight $H_{AJ}(f_i)$ of an anti-narrowband interference filter, and then processing the frequency domain signal $S_{WIN}(f_i)$ by an anti-narrowband filter to eliminate a narrowband interference signal, and then converting the frequency domain signal into a time domain signal $r_{WIN+AJ}(n)$ by IFFT operation.

In one embodiment, the baseband signal reconstruction module 904 is also used for obtaining a carrier Doppler estimation value $\hat{f}_d^k$ of a kth user and tracking a carrier phase value $\hat{\varphi}_k$ in real time by using a carrier tracking loop; obtaining a code phase $\hat{\tau}_k$ of the kth user by using a code tracking loop; obtaining an estimation of a spreading code $C_k$ of a received signal of the kth user by using a code correlation accumulated value; using a symbol correlation accumulated value after despreading to obtain estimations of a received signal amplitude $A_k$ and an information bit $d_k$ of the kth user, thus reconstructing reconstructed baseband received data $\hat{r}_k$ of each user.

In one embodiment, the matched filtering module 906 is also used for performing windowing processing on the reconstructed baseband received data $\hat{r}_k(n)$ to obtain a signal $\hat{r}_{WIN}^k(n)$ after the windowing processing;

performing FFT transformation on N points $\hat{r}_{WIN}^k(n)$, and transforming the time domain signal into a frequency domain signal $\hat{s}_{WIN}^k(f_i)$;

multiplying the frequency domain signal $\hat{s}_{WIN}^k(f_i)$ with the frequency domain weight $H_{AJ}(f_i)$ of the anti-narrowband interference filter to obtain a frequency domain signal after matched filtering; and performing IFFT transformation on the frequency domain signal after matched filtering to obtain reconstructed signals $\hat{r}_{WIN+AJ}^k(n)$ after matched filtering.

In one embodiment, the compensation module 908 is also used for accumulating the reconstructed signals $\hat{r}_{WIN+AJ}^k(n)$ of the multiple channels to obtain a reconstructed accumulated value $$\sum_{k=1}^{K} \hat{r}_{WIN+AJ}^k(n);$$

obtaining a compensation value $\varepsilon(nT_s)$ according to the difference between the time domain signal $r_{WIN+AJ}(n)$ and the reconstructed accumulated value $$\sum_{k=1}^{K} \hat{r}_{WIN+AJ}^k(n);$$

and compensating the reconstructed signals $\hat{r}_{WIN+AJ}^k(n)$ with the compensation value $\varepsilon(nT_s)$ to obtain the actual received signal $r_k(n)=\hat{r}_{WIN+AJ}^k(n)$ of the each channel.

In one embodiment, the joint suppression module 910 is also used for finely tracking the actual received signal through a traditional code tracking loop and the carrier tracking loop, and obtaining a pseudo-code ranging value and a carrier-to-noise ratio estimation value after removing the multiple access interference.

In one embodiment, the joint suppression module 910 is also used for if a user pseudo-code ranging value and a carrier-to-noise ratio estimation value after removing the multiple access interference meet performance requirements, clearing current data, and starting processing of newly received data; meanwhile, updating the multi-user spreading code cumulative power spectrum function $$\sum_{k=1}^{K} S_{PN}^k(f_i),$$

in weight generation of the anti-narrowband interference filter to $$\sum_{k=1}^{K} A_k^2 S_{PN}^k(f_i)$$

by using a signal amplitude estimation value $A_k$ of each actual user; and if the user pseudo-code ranging value and the carrier-to-noise ratio estimation value after removing the multiple access interference do not meet the performance requirements, iteratively processing the received signal.

Those skilled in the art may understand that all or part of the processes in the method for realizing the above-mentioned embodiments may be completed by instructing related hardware through a computer program, which may be stored in a non-volatile computer-readable storage medium, and when executed, the computer program may include the processes of the above-mentioned embodiments. Among them, any reference to memory, storage, database or other media used in the embodiments provided in the present disclosure may include non-volatile and/or volatile memory. The non-volatile memory may include read-only memory (ROM), programmable ROM (PROM), electrically programmable ROM (EPROM), electrically erasable programmable ROM (EEPROM) or flash memory. The volatile memory may include random access memory (RAM) or external cache memory. By way of illustration and not limitation, RAM is available in various forms, such as static RAM (SRAM), dynamic RAM (DRAM), synchronous DRAM (SDRAM), double data rate SDRAM (DDRSDRAM), enhanced SDRAM (ESDRAM), synchronous link (Synchlink) DRAM (SLDRAM), memory bus (Rambus) direct RAM (RDRAM), direct memory bus dynamic RAM (DRDRAM), and memory bus dynamic RAM (RDRAM).

The technical features of the above embodiments may be combined at will. In order to simplify the description, all possible combinations of the technical features in the above embodiments are not described. However, as long as there is no contradiction between the combinations of these technical features, they should be considered as the scope recorded in this specification.

The above-mentioned embodiments only express several implementations of the present application, and their descriptions are more specific and detailed, but they should not be understood as limiting the scope of present disclosure patents. It should be pointed out that for those skilled in the art, without departing from the concept of the present disclosure, several modifications and improvements may be made, which are within the protection scope of the present disclosure. Therefore, the protection scope of the patent in the present disclosure shall be subject to the appended claims.

What is claimed is:

1. A method for joint suppression of narrowband and multiple access interference, wherein the method comprises:

performing time domain windowing processing on a received signal, and performing frequency domain interference processing on a signal after windowing processing to obtain a matched filter and a time domain signal;

performing parallel acquisition on multi-channel signals of the time domain signal by using multi-channel receiving channels to obtain reconstructed baseband received data for a signal of each channel;

filtering the reconstructed baseband received data by using the matched filter to obtain reconstructed signals after matched filtering;

accumulating the reconstructed signals of multiple channels to obtain a reconstructed accumulated value, obtaining a compensation value according to a difference between the time domain signal and the reconstructed accumulated value, and compensating the reconstructed signals with the compensation value to obtain an actual received signal of the each channel; and when a pseudo-code ranging value and a carrier-to-noise ratio estimation value of the actual received signal meet a threshold, outputting a joint suppression result;

performing the time domain windowing processing on the received signal, and performing the frequency domain interference processing on the signal after windowing processing to obtain a matched filter and the time domain signal, comprising:

acquiring a window function w(n), and multiplying the received signal r(n) with the window function w(n) to obtain a windowed signal $r_{WIN}(n)$;

performing FFT transformation on the windowed signal $r_{WIN}(n)$, and obtaining a frequency domain signal $S_{WIN}(f_i)$, wherein $f_i$ represents an ith spectral line;

generating a frequency domain weighting vector value $H_{AJ}(f_i)=[h_0, h_1, \ldots, h_{N-1}]$ of an adaptive anti-narrowband interference filter according to the frequency domain signal $S_{WIN}(f_i)$;

generating a spreading code cumulative power spectrum function $$\sum_{k=1}^{K} S_{PN}^k(f_i)$$

of all users, setting an initial value of the frequency domain weighting vector value $H_{AJ}(f_i)$ to 0, and calculating an effective carrier-to-noise ratio of an initial signal;

judging a weighting value $h_i$ corresponding to each spectral line $f_i$ by adopting a polling method, and if a weighting value $h_i$ corresponding to the spectral line is set to 0 or $$\frac{1}{S_{WIN}(f_i)},$$

a user equivalent carrier-to-noise ratio increases, then setting $h_i$ to 0 or $$\frac{1}{S_{WIN}(f_i)},$$

otherwise setting $h_i$ to 1;

generating a multi-user spreading code cumulative power spectrum function $$\sum_{k=1}^{K} S_{PN}^k(f_i),$$

setting an initial value of a frequency domain weighting vector value $H_{AJ}(f_i)$ to be all 1, and calculating an equivalent carrier-to-noise ratio of an initial signal and a pseudo-code tracking accuracy of a coherent delay locked loop;

judging a weighting value $h_i$ corresponding to each spectral line $f_i$ by adopting the polling method, and if the weighting value $h_i$ corresponding to the spectral line is set to 0 or $$\frac{1}{S_{WIN}(f_i)},$$

a user equivalent carrier-to-noise ratio CNR and a pseudo-code tracking accuracy value are improved, then setting $h_i$ to 0 or $$\frac{1}{S_{WIN}(f_i)},$$

otherwise setting $h_i$ to 1; and finally, optimizing to obtain a frequency domain weight $H_{AJ}(f_i)$ of an anti-narrowband interference filter, and then processing the frequency domain signal $S_{WIN}(f_i)$ by an anti-narrowband filter to eliminate a narrowband interference signal, and then converting the frequency domain signal into a time domain signal $r_{WIN+AJ}(n)$ by IFFT operation.

2. The method for joint suppression of narrowband and multiple access interference according to claim 1, wherein performing the parallel acquisition on the multi-channel signals of the time domain signal by using the multi-channel receiving channels to obtain the reconstructed baseband received data for the signal of the each channel, comprising:

obtaining a carrier Doppler estimation value $\hat{f}_d^k$ of a kth user and tracking a carrier phase value $\hat{\varphi}_k$ in real time by using a carrier tracking loop; obtaining a code phase $\hat{\tau}_k$ of the kth user by using a code tracking loop; obtaining an estimation of a spreading code $C_k$ of a received signal of the kth user by using a code correlation accumulated value; using a symbol correlation accumulated value after despreading to obtain estimations of a received signal amplitude $A_k$ and an information bit $d_k$ of the kth user, thus reconstructing reconstructed baseband received data $\hat{r}_k$ of each user.

3. The method for joint suppression of narrowband and multiple access interference according to claim 2, wherein filtering the reconstructed baseband received data by using the matched filter to obtain the reconstructed signals after matched filtering, comprising:

performing windowing processing on the reconstructed baseband received data $\hat{r}_k(n)$ to obtain a signal $\hat{r}_{WIN}^k(n)$ after the windowing processing;

performing FFT transformation on N points $\hat{r}_{WIN}^k(n)$, and transforming the time domain signal into a frequency domain signal $\hat{s}_{WIN}^k(f_i)$;

multiplying the frequency domain signal $\hat{s}_{WIN}^k(f_i)$ with the frequency domain weight $H_{AJ}(f_i)$ of the anti-narrowband interference filter to obtain a frequency domain signal after matched filtering; and performing IFFT transformation on the frequency domain signal after matched filtering to obtain reconstructed signals $\hat{r}_{WIN+AJ}^k(n)$ after matched filtering.

4. The method for joint suppression of narrowband and multiple access interference according to claim 3, wherein accumulating the reconstructed signals of the multiple channels to obtain the reconstructed accumulated value, obtaining the compensation value according to the difference between the time domain signal and the reconstructed accumulated value, and compensating the reconstructed signals with the compensation value to obtain the actual received signal of the each channel, comprising:

accumulating the reconstructed signals $\hat{r}_{WIN+AJ}^{k}(n)$ of the multiple channels to obtain a reconstructed accumulated value $$\sum_{k=1}^{K}\hat{r}_{WIN+AJ}^{k}(n);$$

obtaining a compensation value $\varepsilon(nT_s)$ according to the difference between the time domain signal $r_{WIN+AJ}(n)$ and the reconstructed accumulated value $$\sum_{k=1}^{K}\hat{r}_{WIN+AJ}^{k}(n);$$

wherein $T_s$ is a sampling period; and compensating the reconstructed signals $\hat{r}_{WIN+AJ}^{k}(n)$ with the compensation value $\varepsilon(nT_s)$ to obtain the actual received signal $r_k(n)=\hat{r}_{WIN+AJ}^{k}(n)+\varepsilon(n)$ of the each channel.

5. The method for joint suppression of narrowband and multiple access interference according to claim 4, wherein the method also comprises:

finely tracking the actual received signal through a traditional code tracking loop and the carrier tracking loop, and obtaining a pseudo-code ranging value and a carrier-to-noise ratio estimation value after removing the multiple access interference.

6. The method for joint suppression of narrowband and multiple access interference according to claim 1, wherein when the pseudo-code ranging value and the carrier-to-noise ratio estimation value of the actual received signal meet a threshold, outputting the joint suppression result, comprising:

if a user pseudo-code ranging value and a carrier-to-noise ratio estimation value after removing the multiple access interference meet performance requirements, clearing current data, and starting processing of newly received data; meanwhile, updating the multi-user spreading code cumulative power spectrum function $$\sum_{k=1}^{K}S_{PN}^{k}(f_i)$$

in weight generation of the anti-narrowband interference filter to $$\sum_{k=1}^{K}A_k^2 S_{PN}^{k}(f_i)$$

by using a signal amplitude estimation value $A_k$ of each actual user; and if a user pseudo-code ranging value and a carrier-to-noise ratio estimation value after the multiple access interference do not meet the performance requirements, iteratively processing the received signal.

7. A device for joint suppression of narrowband and multiple access interference, comprising:

a narrowband interference filtering module, used for performing time domain windowing processing on a received signal, and performing frequency domain interference processing on a signal after windowing processing to obtain a matched filter and a time domain signal;

a baseband signal reconstruction module, used for performing parallel acquisition on multi-channel signals of the time domain signal by using multi-channel receiving channels to obtain reconstructed baseband received data for a signal of each channel;

a matched filtering module, used for filtering the reconstructed baseband received data by using the matched filter to obtain reconstructed signals after matched filtering;

a compensation module, used for accumulating the reconstructed signals of multiple channels to obtain a reconstructed accumulated value, obtaining a compensation value according to a difference between the time domain signal and the reconstructed accumulated value, and compensating the reconstructed signals with the compensation value to obtain an actual received signal of the each channel; and a joint suppression module, used for when a pseudo-code ranging value and a carrier-to-noise ratio estimation value of the actual received signal meet a threshold, outputting a joint suppression result;

the narrowband interference filtering module is also used for acquiring a window function $w(n)$, and multiplying the received signal $r(n)$ with the window function $w(n)$ to obtain a windowed signal $r_{WIN}(n)$;

performing FFT transformation on the windowed signal $r_{WIN}(n)$, and obtaining a frequency domain signal $S_{WIN}(f_i)$, wherein $f_i$ represents an ith spectral line;

generating a frequency domain weighting vector value $H_{AJ}(f_i)=[h_0, h_1, \ldots, h_{N-1}]$ of an adaptive anti-narrowband interference filter according to the frequency domain signal $S_{WIN}(f_i)$;

generating a spreading code cumulative power spectrum function $$\sum_{k=1}^{K}S_{PN}^{k}(f_i)$$

of all users, setting an initial value of the frequency domain weighting vector value $H_{AJ}(f_i)$ to 0, and calculating an effective carrier-to-noise ratio of an initial signal;

judging a weighting value $h_i$ corresponding to each spectral line $f_i$ by adopting a polling method, and if a weighting value $h_i$ corresponding to this spectral line is set to 0 or $$\frac{1}{S_{WIN}(f_i)},$$

a user equivalent carrier-to-noise ratio increases, then setting $h_i$ to 0 or $$\frac{1}{S_{WIN}(f_i)},$$

otherwise setting $h_i$ to 1;

generating a multi-user spreading code cumulative power spectrum function $$\sum_{k=1}^{K} S_{PN}^{k}(f_i),$$

setting an initial value of a frequency domain weighting vector value $H_{AJ}(f_i)$ to be all 1, and calculating an equivalent carrier-to-noise ratio of an initial signal and a pseudo-code tracking accuracy of a coherent delay locked loop:

judging a weighting value $h_i$ corresponding to each spectral line $f_i$ by adopting a polling method, and if a weighting value $h_i$ corresponding to this spectral line is set to 0 or $$\frac{1}{S_{WIN}(f_i)},$$

a user equivalent carrier-to-noise ratio CNR and a pseudo-code tracking accuracy value are improved, then setting $h_i$ to 0 or $$\frac{1}{S_{WIN}(f_i)},$$

otherwise setting $h_i$ to 1; and finally, optimizing to obtain a frequency domain weight $H_{AJ}(f_i)$ of an anti-narrowband interference filter, and then processing the frequency domain signal $S_{WIN}(f_i)$ by an anti-narrowband filter to eliminate a narrowband interference signal, and then converting the frequency domain signal into a time domain signal $r_{WIN+AJ}(n)$ by IFFT operation.

* * * * *